Patented Jan. 14, 1930

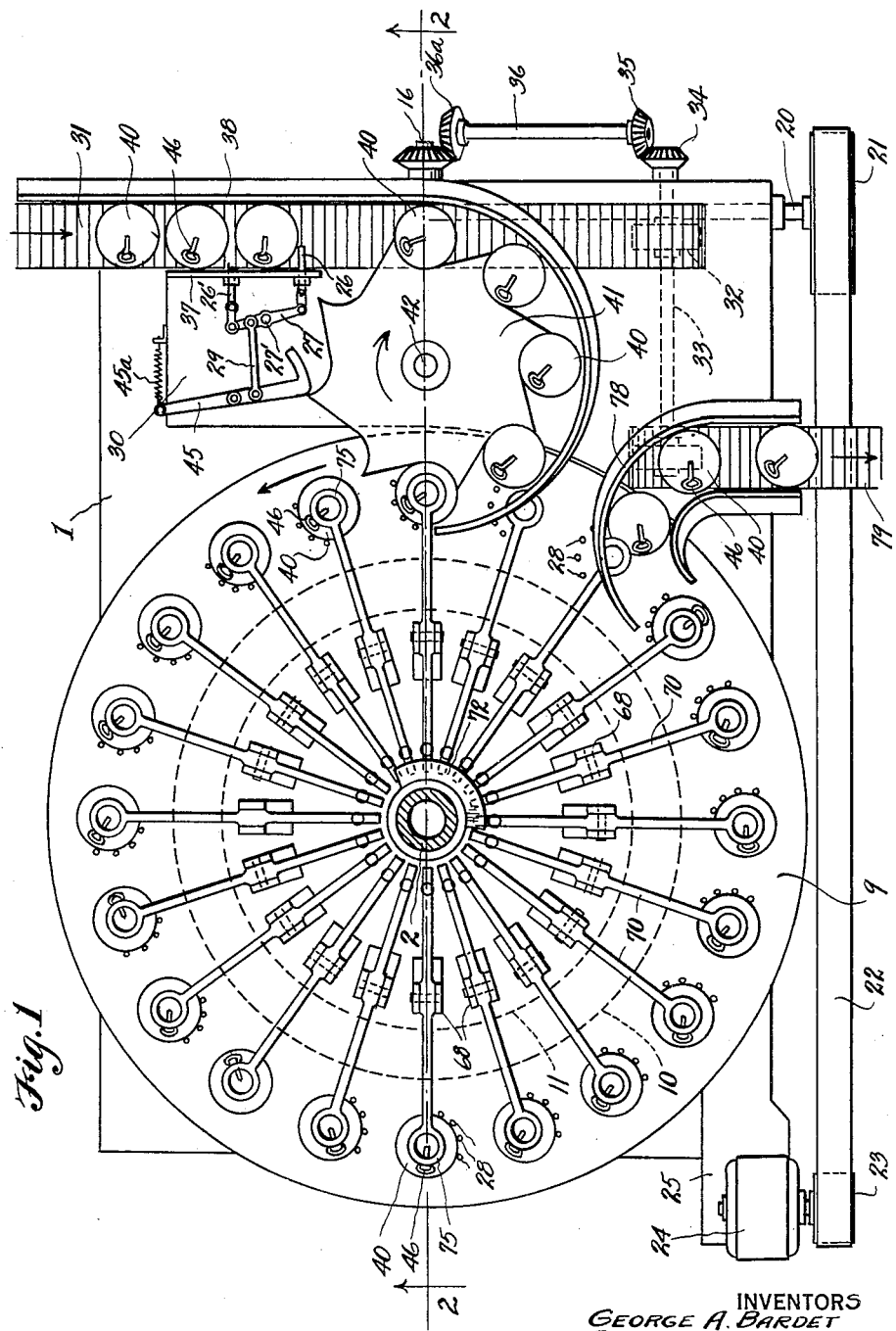

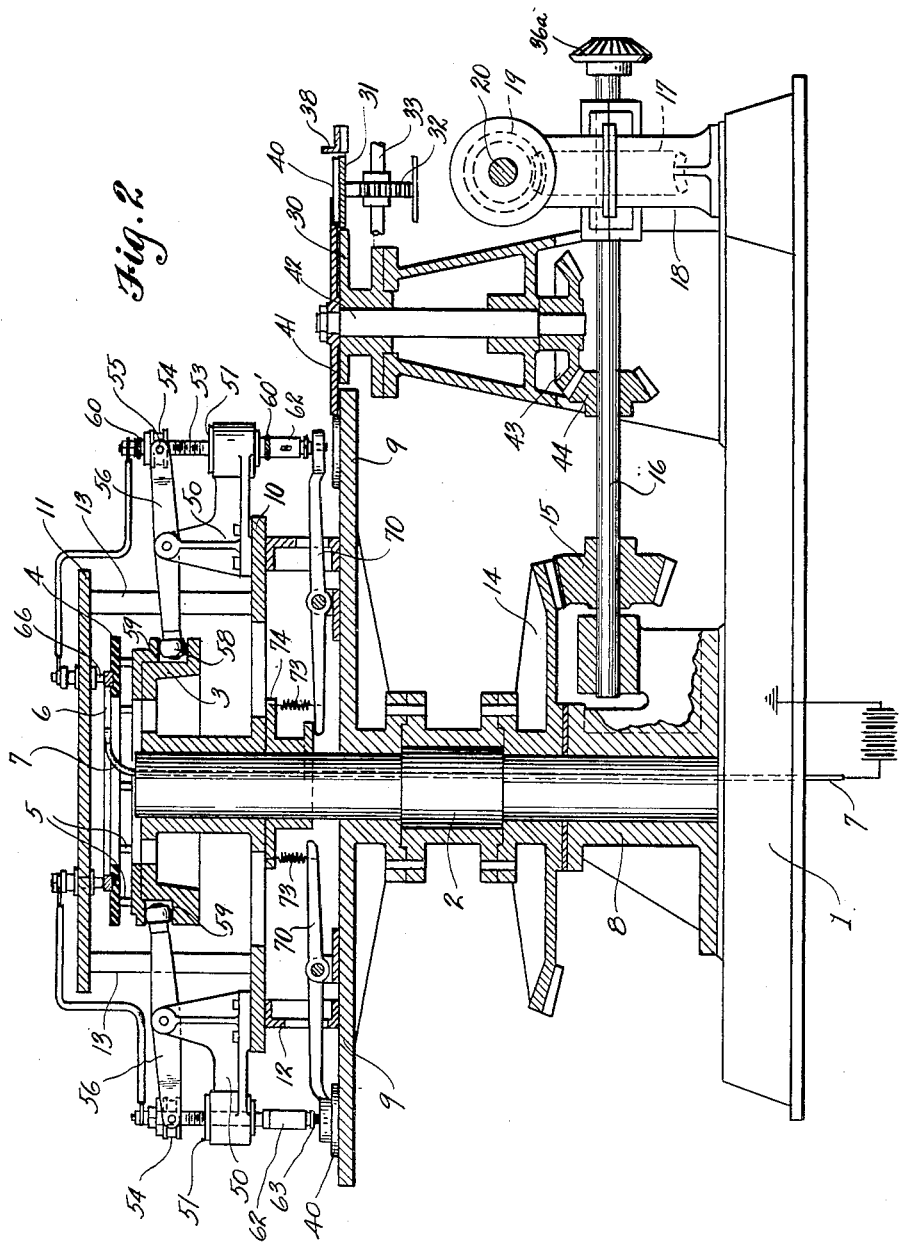

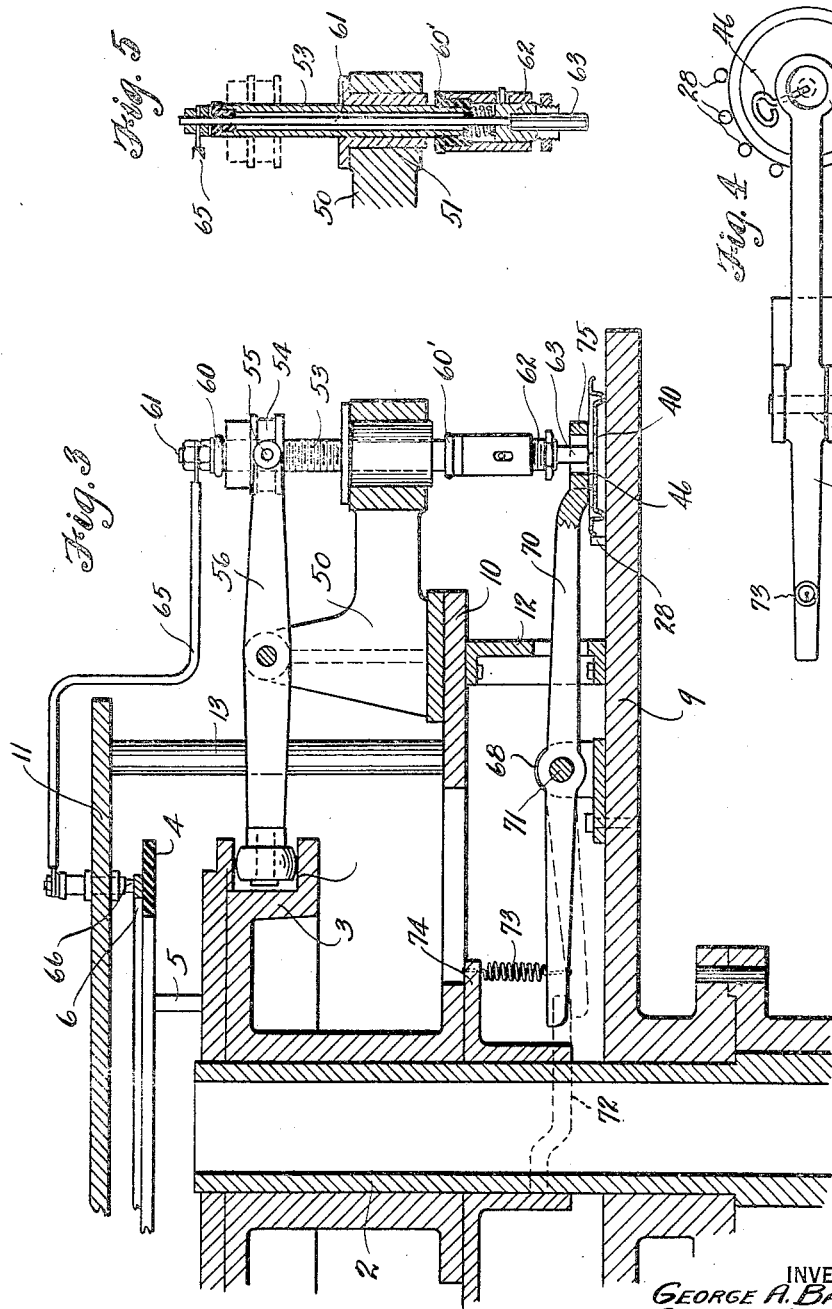

1,743,519

UNITED STATES PATENT OFFICE

GEORGE A. BARDET AND GEORGE V. BARDET, OF BERKELEY, CALIFORNIA, ASSIGNORS TO M. J. B. CO., OF SAN FRANCISCO, CALIFORNIA, A CORPORATION OF DELAWARE

KEY-SOLDERING MACHINE

Application filed March 10, 1928. Serial No. 260,661.

This invention relates to improvements in machines for attaching to key opened cans or containers, the individual keys whereby the opening is to be done. More particularly, the invention relates to means for holding the keys securely against a can end or cover while being soldered thereto.

Heretofore it has been the practice to place the keys on the can ends and to attach them thereto by the fusing of small pieces of solder that are placed on the cans with the keys; the solder serving also, in some instances, for sealing the vents in the cans through which they are vacuumized. Recently, a new method of attaching the keys has been devised which is more satisfactory but which has necessitated certain improvements in the mechanism whereby the keys are held in place while soldering is carried on. This new method consists of, first, dipping the ends of the keys in molten solder so that a very small amount will adhere thereto and this is permitted to harden; then, after the keys have been assembled with the can ends or covers, an electric current is caused to be passed therethrough, by moving one terminal of the circuit into contact with the key, which will melt the solder and thereby effect the soldering of the key to the end. For effectively carrying out this operation, it is quite essential that the keys be held tightly against the ends during the solder fusing and cooling period or the soldered connection will not be effective. It is also quite essential that the key and can end be held at a certain position relative to the movable terminal of the circuit in order that a proper contact may result.

In view of the above, it has been the principal object of this invention to provide automatically operated means for use in a key soldering machine whereby the keys may be held secure on the ends during the soldering, or attaching operation, and which serve also to hold the ends and keys at a proper level for contact by the circuit terminals when the latter are adjusted thereagainst to effect fusing of the solder on the keys.

It is also an object of the invention to provide a key soldering machine into which the can ends may be delivered with their keys placed thereon and wherein there are key "hold down" levers operable into and from holding relation with the keys to hold them against movement with respect to the ends during the soldering operation and which do not interfere with application of the circuit closing terminal to the keys.

Other objects of the invention reside in the details of construction and in the combination of parts whereby an efficient and satisfactorily operating machine is provided.

In accomplishing these and other objects of the invention, we have provided the improved details of construction, the preferred forms of which are illustrated in the accompanying drawings, wherein—

Figure 1 is a plan view of a key soldering machine in which there are key "hold down" levers operable in accordance with the present invention; parts of the machine being broken away for better illustration.

Figure 2 is a central, vertical section of the machine, taken substantially on the line 2—2 in Figure 1.

Figure 3 is an enlarged detail of one of the key soldering units and hold down levers.

Figure 4 is a plan view of a "hold down" lever, as engaged with a key and can end wall.

Figure 5 is a sectional view of one of the soldering elements.

Referring more in detail to the drawings—

1 designates the base, or bed plate, of the machine on which a hollow, vertical shaft 2 is rigidly fixed. Mounted on the upper end of the shaft is a cam track plate 3 above which an insulator plate 4 is mounted by studs 5 fixed in plate 3; the plate 4 being equipped on its upper surface with a contact ring 6 arranged concentric to the axial line of shaft 2 and connected with a circuit wire 7 which leads thereto through the hollow shaft 2.

At the lower end of shaft 2 is a thrust bearing 8 and resting on this and rotatable on the shaft is a rotary frame comprising horizontal turrets 9, 10 and 11 which are connected rigidly by suitable vertical elements 12 and 13. Secured to the lower portion of this frame and forming the bottom member thereof, is a bevel gear 14 adapted to be driven by a pinion 15 on a horizontally mounted shaft 16, the outer end of which is provided with a worm wheel 17 inclosed within a casing 18. A worm 19 driven by a shaft 20 imparts motion to the worm wheel and in turn is driven by a pulley 21 that is fixed on the outer end of the shaft. The pulley is connected by a belt 22 with the driving pulley 23 of an electric motor 24 mounted on a bracket 25 arranged on the base 1.

In this construction, the lower horizontal turret 9 of the revoluble frame serves as the carrier on which the can ends are delivered for the key attaching operation and, as here illustrated, this is equipped with twenty end receiving stations located in a circular row at equally spaced intervals. Each station is defined by positioning pins 28 arranged in the turret in semi-circular rows serving as abutments to receive the ends thereagainst as a means for positioning them in proper relation to the key "hold down" levers and soldering devices.

Means are provided for automatically seating the ends on the turret during rotation of the frame and, later, for removing them. The seating means comprises a stationary platform 30 located adjacent the edge of the turret 9 along the edge of which a conveyer belt 31 operates. This conveyer runs over a sprocket 32 mounted on a shaft 33 which, at its outer end is provided with a beveled gear 34 driven by a similar gear 35 on the end of shaft 36 connected by gearing 36ª to shaft 16. A guide bar 37 is fixed along the inner edge of the conveyer to retain the ends thereon and on the opposite side is a guide 38 that performs a like function. The conveyer 31 carries the can ends, designated by reference numeral 40, into a star wheel 41 mounted on a vertical shaft 42 driven by gears 43—44 from the shaft 16. The movement of the can ends from the conveyer belt 31 into the star wheel 41 is synchronized by reciprocally actuated stops 26 and 26' which extend into the path of the can ends and which are connected pivotally with the ends of a rocker lever 27 that is centrally pivoted as at 27' to the table 30. The lever 27 is connected by a link 29 with a trip lever 45 pivotally mounted on the table 30, with one end yieldably held, by a spring 45ª, in the path of the star wheel 41 so that, as the latter rotates, the lever will be oscillated and this in turn will reciprocate the stops 26 and 26' into and from the path of the can ends delivered on conveyer 31 to release them one at a time for delivery to the star wheel. The movement of the star wheel is also synchronized with movement of the revolving turret 9 that it operates to deposit a can end 40 in each of the receiving stations as they are brought successively into receiving position.

When the ends are delivered onto the turret 9, each carries a key 46 that has been so placed on the upper end of the can that the solder tipped end of the key is disposed centrally or approximately at the center of the can, as shown in Figure 4. The preferred way of thus locating the keys is to place them in depressions formed to receive them during the process of stamping out the can ends. By so locating the ends of the keys on the can ends, it is not essential that the ends be located in any particular manner on the turret so long as they are properly placed against the positioning pins 28.

Fixed to the turret 10 of the revoluble frame so as to extend directly over each of the various can stations, are rigidly mounted brackets 50 which, at their outer ends, carry tubular bushings 51 that are coaxially alined with the ends 40 delivered onto the turret 9 and slidably mounted in the bushings are tubular shafts 53, each of which is threaded at its upper end through a block 54 provided with trunnions 55 that serve for pivotally connecting the tubes to operating levers 56 pivotally supported by the brackets 50 and having rollers 58 at their inner ends which travel within a cam track 59 provided in the periphery of the cam plate 3. This track is so arranged that, during rotation of the turret the tubular shafts 53 are caused, when at a certain location, to be momentarily lowered in the housings 51. At both upper and lower ends of tubes 53 are arranged insulating bushings 60 and 60', as shown in Figure 5, for mounting in each a conductor rod 61 which, at its lower end, is threaded into a sleeve 62 which carries a carbon terminal 63. Circuit wires 65, leading to one side of an electric circuit, connect the upper ends of rods 61 with brushes 66 carried by turret 11 in rubbing contact with ring 6. The current used in this instance preferably is of low voltage and high amperage.

Also, mounted on the turret 9 by means of supporting brackets 68 fixed rigidly to the turret in radial alinement with each of the can stations, are the key "hold down" levers 70. These are pivotally mounted at about their centers by pins 71 and have their outer end portions centrally overlying the ends and their inner ends disposed for contact with a segmental cam flange 72 fixed to the shaft 2 at such position as to cause the outer ends of the levers to be engaged thereby and held in raised position while traveling between the end discharge and receiving stations. Springs 73 are attached to the inner ends of the levers and to a fixed member 74 to cause the outer ends of the levers to be held yieldably against the can ends and keys thereon when not positively lifted by the cam flange 72.

The outer ends of the "hold down" levers 70 have ring-like portions 72 concentric of the cans and adapted to be pressed flatly against the can ends and against the keys. The openings in these ring-like parts are of sufficient diameter to permit projection thereinto of the carbon terminals for contact with the keys that are disposed on the can ends.

The operation is as follows:

As the turret 9 revolves, can ends 40 are delivered by the conveyer 31 and star wheel 41 successively into the receiving stations on the turret. As the ends are seated in their stations, the inner ends of the hold down levers 70 being released from cam 72, permits the outer, ring-like ends to be actuated downwardly, by the springs 73, against the keys and can ends to flex the ends inwardly and to hold the keys securely and tightly thereagainst. Each lever 56, then, by virtue of its connection with cam track 59, is caused, when at a certain position during rotation of the turret, to move its shaft 53 downwardly to thereby cause the carbon terminal 63 carried by the shaft to momentarially contact with the key on the end to close a circuit through it to fuse the solder that, previous to assembling the keys with the ends, had been deposited on the key end by dipping it in molten solder. While the key is still held tightly against the end, the solder cools and thereby the key is attached.

As the ends approach the discharge point the "hold down" levers are lifted therefrom by being brought into contact with the cam flange 72 and, as the ends arrive at the discharge point, they are removed by contact with a transfer rail 78 and are delivered onto an outgoing conveyer belt 79 operated by suitable connection with shaft 33.

While we have described the "hold down" levers as used in a machine of a particular construction and with soldering devices of a particular type, it is to be understood that the use of "hold down" levers for this purpose is not confined to their adaptation only to this particular machine, as it is readily apparent that they can be adapted to stationary or rotary machines using various types of soldering devices.

While we have shown the machine as designed for attaching keys to can ends, it is readily apparent that, by increasing the distance between the turrets 9 and 10, and by rearranging the "hold down" levers accordingly, closed cans could be passed through the machine and the keys attached to the cans after the ends had been seamed thereto.

Having thus described our invention, what we claim as new therein and desire to secure by Letters Patent, is:

1. In a machine for attaching solder bearing keys to can ends, a support for the can ends. on which the keys have been loosely placed, means for closing an electric circuit through the solder bearing portion of the key to heat it to fuse the solder, a clamping member operable with yielding pressure against the key to hold it tightly against the can end during the solder fusing period and for a short cooling interval thereafter.

2. A machine for attaching solder tipped keys to can ends, comprising a support connected with one side of an electric circuit, an adjustable terminal connected with the other side of the circuit and adapted to be moved from and against a key placed on a can end carried by said support as a means of closing a circuit through the key to fuse the solder thereon and a clamping lever having an end portion adapted to bear against the key to hold it against the can end and means for raising the lever for removal of the end.

3. A machine for attaching solder tipped keys to can ends, comprising a rotary frame, means for delivering ends onto the frame, key "hold down" levers mounted on the frame and operable against keys that are carried on the can ends, means for closing electric circuits through the keys while they are held down by said levers, and means for holding the levers in raised position for removal of the ends.

4. A machine for attaching solder tipped keys to can ends comprising a rotary frame provided with a plurality of end receiving stations, a key "hold down" lever for each station, means for moving the levers to raised position while the ends are being placed in and removed from their stations, means for holding said levers against keys carried by the can ends and means for momentarily closing electric circuits through the keys while held by said levers.

5. A machine for attaching solder tipped keys to can ends, comprising a rotary frame provided with a plurality of end receiving stations, means for automatically delivering ends into the machine into said stations, a key "hold down" lever for each station, means for holding the said levers in raised position while the ends are being placed in and removed from said stations, means for holding said levers against keys carried by the can ends, and means for momentarily closing electric circuits through the keys while held by said levers.

6. In a machine for attaching solder tipped keys to can ends, a can support having connection with one side of an electric circuit, a circuit terminal connected with the other side of the circuit and adjustable from and toward the end, a key "hold down" lever adapted to be actuated against the end and the key to position the latter properly for contact by the adjustable terminal, said lever having an opening therethrough into which the said terminal may be projected for contact with the key.

7. In a machine of the character described, a rotary frame comprising a plurality of receiving stations, means for automatically delivering can ends into said stations and for removing them therefrom, a key "hold down" lever for each of said stations, springs attached to said levers for moving them against keys placed on the can ends, an electric circuit having one side connected with the frame, adjustable terminals corresponding to each of the can stations connected with the other side of the circuit and movable against keys on the ends to close the circuit through the keys for melting the solder thereon, and a fixed cam adapted to be engaged by the levers to lift the latter clear of the ends for removal.

8. In a machine for attaching to can ends keys which are placed to overlie a certain predetermined attaching area of the can end, a can end support, a supporting means for a fusing element mounted in fixed, spaced relation from the can end support, positioning means on the can end support whereby can ends placed thereagainst will be positioned in a definite relation with respect to the fusing element support, a clamping lever having a ring-like end portion adapted to be moved against the can end and key and to encircle said predetermined attaching area of the can end, and a fusing element adjustable in the fusing element support and movable through the ring-like portion of the clamping lever to engage the key.

Signed at San Francisco, California, this 11th day of February 1928.

GEORGE A. BARDET.
GEORGE V. BARDET.